July 20, 1943.　　　J. S. WESTRATE　　　2,324,967
VEHICLE JACK CONSTRUCTION
Filed Sept. 28, 1942　　　2 Sheets-Sheet 1
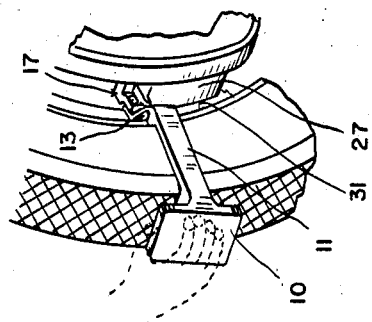
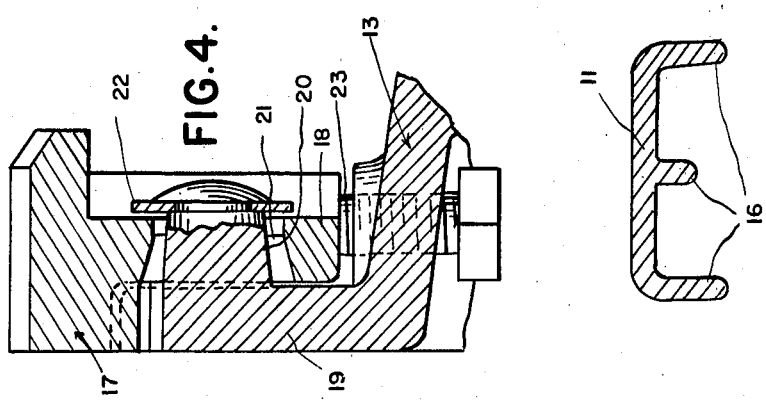
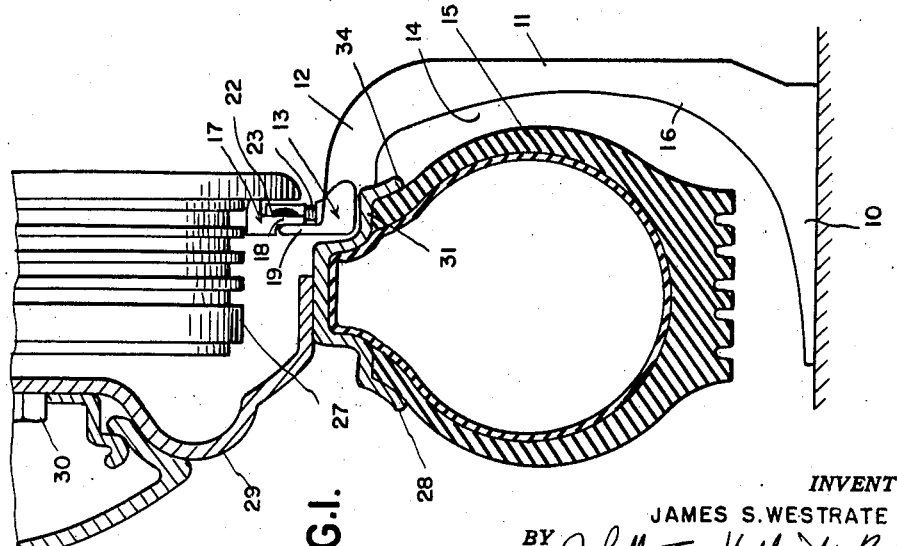
INVENTOR.
JAMES S. WESTRATE
BY *Whittemore Hulbert & Belknap*
ATTORNEYS

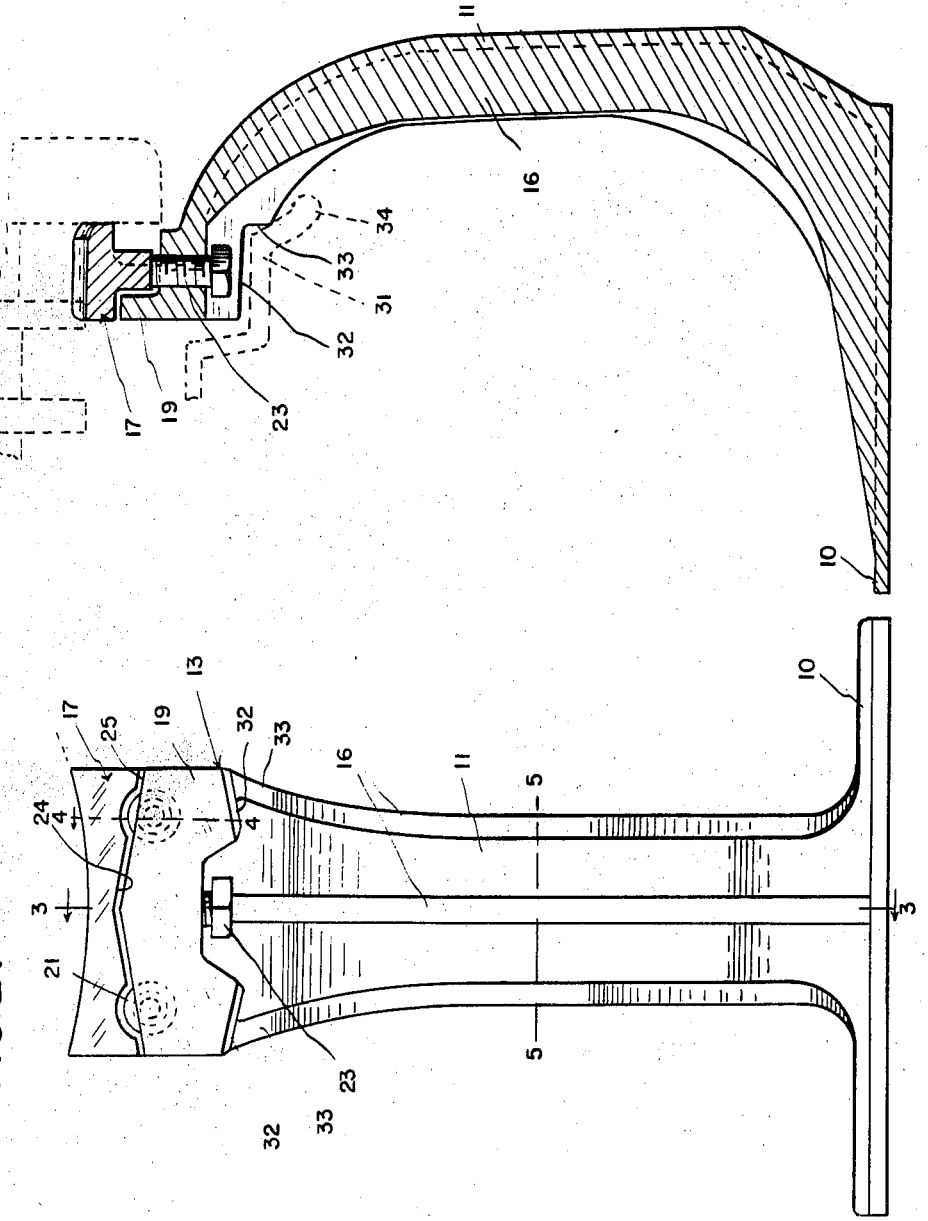

Patented July 20, 1943

2,324,967

UNITED STATES PATENT OFFICE 2,324,967

VEHICLE JACK CONSTRUCTION

James S. Westrate, Detroit, Mich.

Application September 28, 1942, Serial No. 459,967

12 Claims. (Cl. 254—94)

This invention relates to improvements in jacks of the type employed to lift a ground engaging wheel of a vehicle sufficiently to enable removal of the tire or wheel.

More particularly the invention concerns itself with jacks of the type designed to raise the selected wheel off the ground by merely rolling the vehicle either forwardly or rearwardly. While jacks embodying the above fundamental principle of operation are advantageous because they enable lifting a ground engaging wheel of a vehicle with little effort on the part of the operator, nevertheless, they have proved objectionable in practice because of the difficulty in maintaining the jacks in proper position relative to the wheel during the interval the vehicle is rolled to raise the wheel.

The above objection is overcome with this invention by providing a jack having a head constructed to react between opposed surfaces of the wheel structure during rotation of the wheel to produce a wedging engagement of the head with the opposed surfaces aforesaid of the wheel. In the present instance the jack head is formed of two relatively movable parts respectively engageable with the annular brake flange of the conventional brake drum on the wheel and with the inner surface of the tire bead engaging seat on the tire carrying rim of the wheel so that rotation of the wheel in either of its two directions of rotation rocks one part relative to the other sufficiently to bind the head between the two parts aforesaid of the wheel. Another object of this invention is to provide a jack having means for vertically adjusting one part relative to the other to compensate for variations in the radial dimension between the outer surface of the annular brake drum and the inner surface of the tire bead engaging seat on the rim of the wheel.

A further object of this invention is to provide a jack which is not only strong and durable in construction but, at the same time, is relatively light in weight.

The foregoing, as well as other objects, will be made more apparent as this description proceeds, especially when considered in connection with the accompanying drawings, wherein:

Figure 1 is a side elevational view of a jack constructed in accordance with this invention and showing the same in operative relation to a vehicle wheel;

Figure 2 is a front elevational view of the jack shown in Figure 1;

Figure 3 is a sectional view taken on the line 3—3 of Figure 2;

Figure 4 is a sectional view taken on the line 4—4 of Figure 2;

Figure 5 is a cross sectional view taken on the line 5—5 of Figure 2; and

Figure 6 is a fragmentary perspective view showing the manner in which the jack is positioned relative to the wheel preparatory to raising the latter.

The jack forming the subject matter of this invention is shown in the several figures of the drawings as comprising a flat ground engaging part in the form of a foot or base 10 and a stanchion 11 extending upwardly from the foot 10 at one edge of the latter. The upper end of the stanchion 11 is provided with a portion 12 which extends laterally over the foot 10 and supports a head portion 13 in a position directly above the central portion of the base or foot 10. The arrangement is such as to provide ample clearance 14 for receiving the pneumatic tire shown in Figure 1 and designated by the reference character 15.

The base 10, stanchion 11 and head portion 13 are formed integral and are preferably, although not necessarily, cast from malleable iron. Other metals may be used to cast the above integral parts of the jack and the present invention not only contemplates casting the jack from any suitable metal but also contemplates forming the jack from pressed metal. However, in the interest of strength and economy in manufacture, I prefer to employ a cast construction and, therefore, such a construction is specifically illustrated herein.

Regardless of the specific metal employed in forming the jack, I prefer to reinforce the construction with ribs 16. In the specific illustrated embodiment of the invention three ribs are shown, one at each vertical edge of the stanchion 11 and another intermediate the vertical edges of the stanchion. The lower ends of the ribs merge into the base or foot 10 of the jack and the upper ends of the ribs terminate at the head portion 13. This arrangement imparts the requisite strength to the jack without appreciably increasing the weight of the latter.

Upon reference to Figures 2 to 4, inclusive, of the drawings, it will be noted that the head 13 of jack includes a saddle part 17 having a depending flange 18 positioned adjacent an upstanding flange 19 on the head portion 13 and supported on the latter by means of laterally spaced studs 20 shown in Figure 4 as cast integral with the flange 19 on the head portion 13. The studs respectively extend through enlarged openings 21 formed in the flange 18 of the saddle and the free ends of the studs are peened over suitable washers 22 having an outside diameter greater than the diameter of the openings 21. The arrangement is such as to maintain the saddle 17 in assembled relation with the head portion 13 of the jack and, at the same time, permit free vertical movement, as well as rocking movement, of the saddle relative to the head portion 13 of the jack.

Referring now to Figure 3 of the drawings, it will be noted that the saddle 17 is fulcrumed intermediate the studs 20 on the upper end of a stud 23 having a shank threaded in a vertical bore formed in the head portion 13 on the vertical centerline of the jack and having a polygonally shaped head located directly beneath the head portion 13 for convenient accessibility. As a result of this construction, the saddle 17 is not only capable of limited rocking movement about the upper end of the stud 23 but is also capable of vertical adjustment by manipulating the stud 23.

Rocking movement of the saddle 17 about the upper end of the stud 23 is restricted by complementary registering surfaces 24 and 25, respectively, on the saddle 17 and head portion 13. As shown in Figure 2 of the drawings, the surfaces 24, 25 have portions which taper downwardly from the vertical centerline of the jack and the surface 24 on the saddle is normally spaced above the surface 25 on the head portion 13 by the fulcrum or stud 26 in order to provide for limited rocking movement of the saddle 17 relative to the head. The construction is such that rocking the saddle 17 in one or the other direction about the stud 26 causes one tapered portion on the saddle to ride along the registering tapered portion on the head portion 13 and "cock" the saddle relative to the head portion. This action is obtained during application of the jack and is largely responsible for wedging the head of the jack between opposed surfaces of a vehicle wheel about to be described.

The jack described above is adapted to be used in connection with a vehicle wheel assembly of the type shown in Figure 1 wherein the reference character 27 indicates a brake drum and wherein the reference character 28 indicates a drop center rim supported on the brake drum by means of a wheel body 29. The central portion of the wheel body 29 is demountably secured to the web of the brake drum in the orthodox manner by the bolts 30.

The head portion of the jack is insertable between the inner surface of the inboard tire bead engaging seat 31 on the drum 28 and the exterior surface of the brake drum 27. In detail, the top surface of the saddle 17 is curved on a radius substantially corresponding to the radius of curvature of the brake drum and has a bearing engagement with the outer surface of the brake drum. The inner surface of the tire bead engaging seat 31 is engaged at circumferentially spaced points by the surfaces 32 formed on the radially inner portion of the head 13 by notching the ribs 16 at opposite edges of the head 13. Notching of the ribs 16 also forms stops 33 which serve to abut the inboard tire retaining flange 34 on the rim 28 to assist in properly positioning the jack relative to the wheel.

The radial space between the brake drum and tire retaining flange 31 on the rim 28 varies to some extent in different wheel assemblies and, accordingly, the stud 23 is previously manipulated to adjust the saddle 17 to provide a snug fit of the head in this space. After the saddle has been properly adjusted with respect to the head portion 13, the jack may be positioned in operative relation to the wheel in the manner indicated in Figure 6 of the drawings. In this figure the jack is shown as positioned at the inboard side of the pneumatic tire 15 with the head of the jack located in the space provided between the brake drum 27 and the tire bead engaging seat 31 on the rim. When the jack is positioned in the above manner, the vehicle is moved forward or backward depending upon whether the jack is located at the front or rear of the wheel and the extent of movement of the vehicle is predetermined to rest the base 10 of the jack squarely on the surface of the ground.

During the above procedure, the wheel is raised with respect to the ground sufficiently to enable the wheel to be readily removed from the brake drum. An important feature of the construction is that the saddle 17 rocks to some extent about the upper end of the stud 23 in response to rotation of the wheel. The saddle is rocked forwardly or rearwardly depending upon the direction of rotation of the wheel and the tapered surfaces 24 and 25 coact to wedge or bind the head between the brake drum and rim during rotation of the wheel. In other words, the jack is effectively secured in position during the interval the wheel is rotated to raise the same by the jack and the possibility of accidental displacement of the jack is thereby reduced to a minimum.

What I claim as my invention is:

1. A jack for a vehicle wheel having radially spaced opposed surfaces, said jack comprising a body having a head portion insertable into the space between said surfaces and engageable with one of said surfaces, a member carried by the head portion and engageable with the other of said surfaces, and a connection between said member and head portion providing for shifting movement of the member on the head portion in response to rotation of the wheel to wedge the head portion and member between said surfaces.

2. A jack for a vehicle wheel having radially spaced opposed surfaces, said jack comprising a body having a head portion insertable into the space between said surfaces and engageable with one of said surfaces, a saddle supported on the head portion for vertical movement relative thereto and engageable with the other of said surfaces, and means for vertically adjusting the saddle relative to the head portion.

3. A jack for a vehicle wheel having concentric surfaces spaced from each other radially of the wheel, said jack comprising a body having a head portion insertable into the space provided between the surfaces and engageable with the outer surface of the wheel, and a saddle supported on the head for limited rocking movement relative to the head and engageable with the inner surface of the wheel.

4. A jack for a vehicle wheel having concentric surfaces spaced from each other radially of the wheel, said jack comprising a body having a head portion insertable into the space provided between the surfaces and engageable with the outer surface of the wheel, and a saddle engageable with the inner surface of the wheel and supported on the head portion for limited rocking movement in response to rotation of the wheel to wedge the head portion and saddle between said surfaces.

5. A jack for a vehicle wheel having concentric surfaces spaced from each other radially of the wheel, said jack comprising a body having a head portion insertable into the space provided between the surfaces and engageable with the outer surface of the wheel, a saddle engageable with the inner surface of the wheel and supported on the head portion for limited rocking movement in response to rotation of the wheel to wedge the head portion and saddle between said surfaces, and means for vertically adjusting the saddle relative to the head portion to compensate for variations in the space between said surfaces of the wheel.

6. A jack for a vehicle wheel having radially spaced opposed surfaces, said jack comprising a body having a head portion insertable into the space between said surfaces and engageable with the outer surface on the wheel, a vertically adjustable stud carried by the head portion, and a saddle fulcrumed on the upper end of the stud for rocking movement in opposite directions relative to the head and having a bearing engagement with the inner surface on the wheel.

7. A jack for a vehicle wheel having concentric surfaces spaced from each other radially of the wheel, said jack comprising a body having a head portion insertable into the space provided between the surfaces and engageable with the outer surface of the wheel, a stud threaded in a vertical bore in the head portion, a saddle having a portion intermediate the ends engaging the upper end of the stud for rocking movement about the upper end of the stud and having a portion engageable with the inner surface on the wheel, and means for limiting rocking movement of the saddle about said stud.

8. A jack for a vehicle wheel having radially spaced opposed surfaces, said jack comprising a body having a head portion insertable into the space between said surfaces and having laterally spaced bearing portions engageable with the outer surface on the wheel, and a saddle supported on the head for rocking movement relative to the head and having a bearing engagement with the inner surface on the wheel.

9. A jack for a vehicle wheel having radially spaced opposed surfaces, said jack comprising a body having a head portion insertable into the space between said surfaces and having laterally spaced bearing portions engageable with the outer surface on the wheel, a stud threaded in a vertical bore formed in the head portion intermediate the bearing portions on the head portion, a saddle having a portion intermediate the ends fulcrumed on the upper end of the stud for rocking movement in opposite directions relative to the head and having a bearing portion engageable with the inner surface on the wheel, and means for securing the saddle to the head portion.

10. A jack for a vehicle wheel having radially spaced opposed surfaces, said jack comprising a body having a head portion insertable into the space between said surfaces and having laterally spaced bearing portions engageable with the outer surface on the wheel, a saddle supported on the head for rocking movement relative to the head and having a bearing engagement with the inner surface on the wheel, and means on the head portion engageable with one side of the wheel to position the head portion laterally with respect to the wheel.

11. A jack for a vehicle wheel having radially spaced opposed surfaces, said jack comprising a body having a head portion insertable into the space between said surfaces and having a bearing portion engageable with the outer surface of the wheel, a saddle supported on the head portion for rocking movement in opposite directions and having a bearing portion engageable with the inner surface of the wheel, and vertically spaced diverging surfaces on registering portions of the head portion and saddle respectively engageable with each other upon rocking the saddle in opposite directions to limit the extent of rocking movement of the saddle in both of said directions.

12. A jack for a vehicle wheel having concentric surfaces spaced from each other radially of the wheel, said jack comprising a body having a head portion insertable into the space provided between the surfaces and engageable with the outer surface of the wheel, a stud threaded in a vertical bore in the head portion, a saddle having a portion intermediate the ends engaging the upper end of the stud for rocking movement about the upper end of the stud and having a portion engageable with the inner surface on the wheel, and vertically spaced diverging surfaces on registering portions of the head and saddle respectively engageable with each other upon rocking the saddle in opposite directions about the upper end of the stud to limit the extent of rocking movement of the saddle in both of said directions.

JAMES S. WESTRATE.